(No Model.) 2 Sheets—Sheet 1.

F. J. COLE & E. W. GRIEVES.
BRACKET SUPPORT AND STOP FOR CAR DOORS.

No. 444,274. Patented Jan. 6, 1891.

Witnesses:
R. Schleicher
Murray C. Boyer

Inventors:
Francis J. Cole &
Edward W. Grieves
by their Attorneys
Howson v Howson (No Model.) 2 Sheets—Sheet 2.
F. J. COLE & E. W. GRIEVES.
BRACKET SUPPORT AND STOP FOR CAR DOORS.
No. 444,274. Patented Jan. 6, 1891.
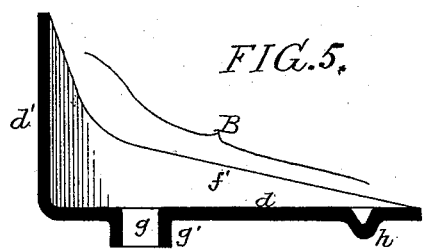
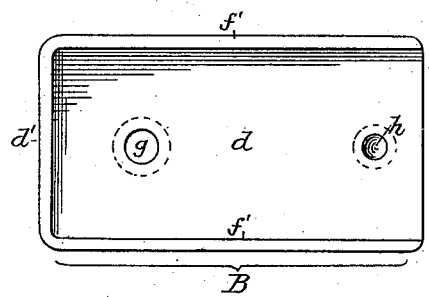
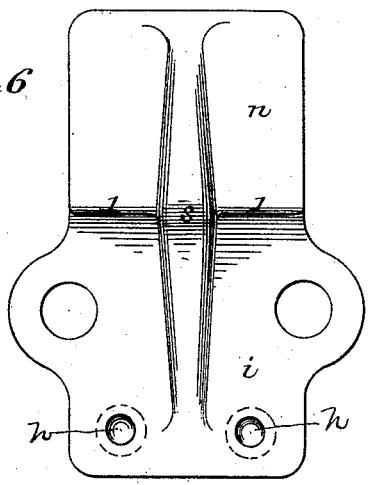
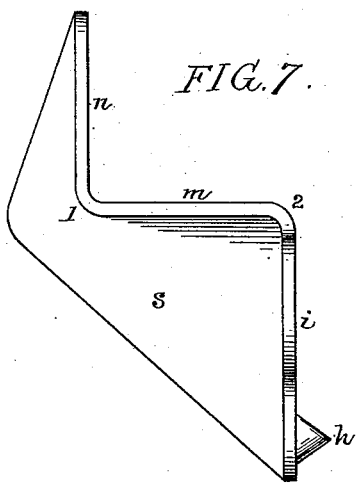
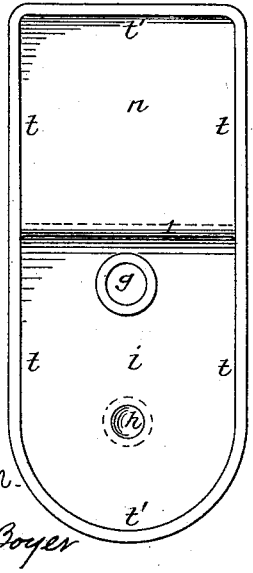
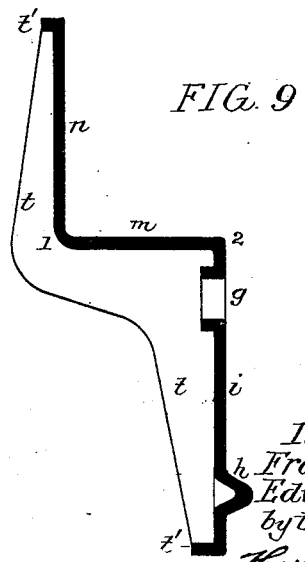
Witnesses:
R. Schleicher
Murray C. Boyer
Inventors:
Francis J. Cole &
Edward W. Grieves
by their Attorneys
Howson & Howson

UNITED STATES PATENT OFFICE.

FRANCIS J. COLE AND EDWARD W. GRIEVES, OF BALTIMORE, MARYLAND.

BRACKET-SUPPORT AND STOP FOR CAR-DOORS.

SPECIFICATION forming part of Letters Patent No. 444,274, dated January 6, 1891.

Application filed July 2, 1890. Serial No. 357,515. (No model.)

*To all whom it may concern:*

Be it known that we, FRANCIS J. COLE and EDWARD W. GRIEVES, both citizens of the United States, and residents of Baltimore, Maryland, have invented certain Improvements in Freight-Car-Door Fixtures, of which the following is a specification.

Our invention relates to the fixtures known as door stops and brackets, the object of our invention being to so construct these fixtures that they will be both lighter and stronger than the corresponding fixtures now used. This object we attain in the manner hereinafter set forth, reference being had to the accompanying drawings, in which—

Figure 1:
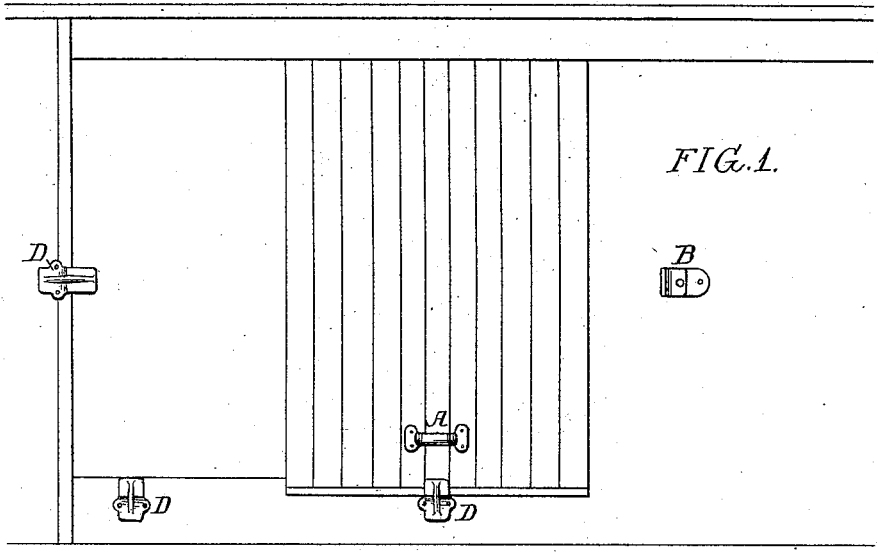
Figure 2:
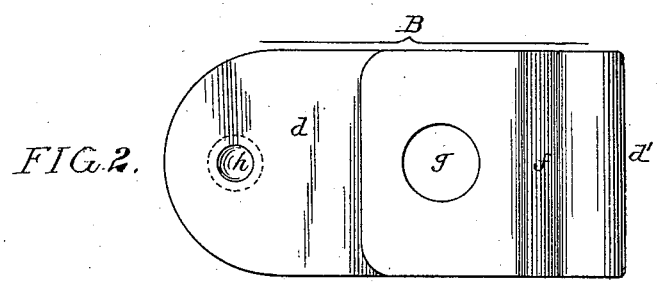
Figure 3:

Figure 1 is a view of part of the side of a freight car and door provided with fixtures made in accordance with our invention. Figs. 2 and 3 are respectively a front view and a longitudinal section of a door-stop constructed in accordance with our invention. Figs. 4 and 5 are like views of another form of said stop. Figs. 6 and 7 are respectively a front view and a section of a door-bracket constructed in accordance with our invention, and Figs. 8 and 9 are like views of another form of said bracket.

The freight-car-door fixtures to which our invention relates are at present made of cast-iron and are objectionable, both because of their weight and because of their lack of strength.

In carrying out our invention, therefore, we make these fixtures of sheet metal, preferably of sheet-steel, in the manner in which we will now describe.

One of the simplest forms of door-stop made in accordance with our invention is that shown in Figs. 2 and 3, the stop B in this case consisting of a single plate of sheet metal bent successively at the points 1, 2, and 3, so as to form the base or attaching plate $d$ and the projecting stop-lug $d'$, with brace $f$ extending from the top of the same to the base-plate $d$, so as to stiffen and strengthen said projecting stop-lug. A bolt-hole $g$ is formed in the base-plate and in that portion which is folded back over the same to form the brace $f$, and a projecting lug or finger $h$ is struck up from the base-plate near the rear end of the same, as shown in Fig. 3, this lug or finger entering the side of the car and serving to prevent displacement of the stop B thereon.

In the modified form of stop shown in Figs. 4 and 5 the projecting stop-lug $d'$ is stiffened and strengthened by bracing-ribs $f'$ at the opposite sides of the plate, instead of by a brace extending completely across the plate, and in this case also an annular rib $g'$ surrounds the opening $g$ in the base-plate, this rib being formed by striking up the metal of the plate in forming the bolt-hole, instead of removing the metal from the plate, as in the stop shown in Figs. 2 and 3.

The door-bracket D consists of a single plate of sheet metal bent at the points 1 2, so as to form an attaching-web $i$, a horizontal bearing-web $m$, and a guard-web $n$, and in order to impart to the bracket the necessary structural strength one or more stiffening or strengthening ribs must be struck up therefrom. Thus in the bracket shown in Figs. 6 and 7 a rib $s$ is struck up from the central portion of the bracket, while in the bracket shown in Figs. 8 and 9 opposite edge ribs $t\ t$ are formed on the bracket, these ribs being also continued, by preference, around the top and bottom of the bracket, as shown at $t'$.

Having thus described our invention, we claim and desire to secure by Letters Patent—

1. The within-described door-stop for freight-cars, the same consisting of a single piece of sheet metal bent to form a base-plate with projecting stop-lug and a brace for the latter, and having one or more retaining lugs or projections struck up from said base-plate, substantially as specified.

2. The within-described bracket for freight-car doors, the same consisting of a single piece of sheet metal bent to form an attaching-web, right-angled bearing-web, and guard-web, and having a central hollow strengthening-rib struck up therefrom, substantially as specified.

3. The within-described bracket for freight-car doors, the same consisting of a single piece of sheet metal bent to form the attaching-web, right-angled bearing-web, and guard-web, and having bent or struck up from the same one or more strengthening-ribs and one or more retaining lugs or projections, substantially as specified.

In testimony whereof we have signed our names to this specification in the presence of two subscribing witnesses.

FRANCIS J. COLE.
    EDWARD W. GRIEVES.

Witnesses:
 MURRAY HANSON,
 WILLIAM H. BERRY.